United States Patent [19]

Hultzsch et al.

[11] B 4,013,609

[45] Mar. 22, 1977

[54] RESINOUS COMPOSITION

[75] Inventors: Kurt Hultzsch, Wiesbaden-Biebrich, Germany; Helmut Fritze, Vienna, Austria

[73] Assignee: Hoechst Aktiengesellschaft, Frankfurt, Germany

[22] Filed: Mar. 18, 1975

[21] Appl. No.: 559,441

[44] Published under the second Trial Voluntary Protest Program on March 23, 1976 as document No. B 559,441.

Related U.S. Application Data

[62] Division of Ser. No. 345,116, March 26, 1973.

[30] Foreign Application Priority Data

Mar. 29, 1972 Germany .......................... 2215268
May 25, 1972 Germany .......................... 2225351

[52] U.S. Cl. ......................... 260/33.6 UA; 106/20; 106/30; 106/32; 260/27 R; 260/78.4 D; 526/14; 526/44; 260/875

[51] Int. Cl.² .................. C08F 8/44; C08F 222/02

[58] Field of Search ............. 260/33.6 UA, 78.5 T, 260/78.4 D; 106/20, 30

[56] References Cited

UNITED STATES PATENTS 3,511,798  5/1970  Isaacson ........................ 260/29.6
3,563,937  2/1971  Nickerson ........................ 260/33.4
3,775,381  11/1973 Hayashi ........................ 260/78.4 D
3,887,513  6/1975  Fritze et al. ............... 260/33.6 UA Primary Examiner—John Kight, III
Attorney, Agent, or Firm—Littlepage, Quaintance, Murphy & Dobyns

[57] ABSTRACT

A resinous composition containing as an essential ingredient a binder comprising a product obtained by I. reacting in a first stage a solution of
   1. a copolymer containing anhydride groups with
   2. at least one alcohol containing up to 2 hydroxy groups to yield a reaction product wherein the anhydride groups are at least partially converted to semiester groups, and II. reacting
   3. the product thus obtained in the presence of water at a temperature in the range from 50° to 120° C with
   4. a salt-forming compound of a polyvalent metal, the solvent present in the first stage of the reaction being compatible with said alcohol and partially miscible with water only to such an extent that two phases are formed therewith together with at least one pigment and an aromatic hydrocarbon as a solvent.

7 Claims, No Drawings

RESINOUS COMPOSITION

This application is a divisional application of U.S.-Pat. application Ser. No. 345,116 filed 3,26,73.

This invention relates to a process for the preparation of a modified copolymer under mild conditions. In particular the invention relates to the preparation of copolymers containing cations of polyvalent metals linked to carboxyl groups. Such copolymers may be used as binders for printing inks.

Synthetic resins for rotogravure printing can, for example, be prepared by polymerisation reactions. Polystyrene, for example, is readily soluble in toluene but it has the disadvantage that it dries too slowly and exhibits an inferior affinity for the pigments. Copolymers from styrene and/or styrene derivatives and maleic anhydride and/or acrylic acid or its derivatives do not exhibit these disadvantages to the same extent. However, they are not suitable for rotogravure printing since they have an inferior behaviour on the paper.

If one attempts to improve the printing properties of these copolymers by converting them to their salt complexes (analogous to resinate complexes), which for colophony is conveniently effected at temperatures above 200°C, the copolymers are partially decomposed and degraded. This decomposition manifests itself in a distinct darkening of the colour, the appearance of distillable decomposition products and a reduction in the mean molecular weight. The improvement in the printing properties therefore is cancelled out, at least in part. Another process for the preparation of the polyvalent metal salts involves double decomposition. The starting resin is first converted into an alkali metal salt thereof in the presence or absence of a solvent and subsequently the readily accessible alkali metal salt is reacted with a reactive compound of a bivalent metal. This method of double decomposition involves a reduction in the number of mols of product produced from a certain member of mols of starting material. It has moreover the disadvantage that the number of cations contained in the resin cannot be adjusted accurately. The melt process as described hereinafter is more economic. In this case, the reaction temperature depends on the type of the starting resin but is also determined by the reactivity of the bivalent metal compound used. For example, with naturally occuring acidic resins such as colophony, temperatures of over 200°C are necessary for reaction.

To improve the physical and application properties of synthetic hydrocarbon resins modified with maleic anhydride, conversion to a salt has been used, especially to the calcium salt. According to one of the known processes, the resin is reacted with a compound of a bivalent metal at temperatures of over 200°C, preferably at 260°C. However difficulties can arise with this reaction. The high temperatures used can again lead to decomposition phenomena. Thus it is desired to improve the manufacturing method of modified hydrocarbon resins still further.

We have now found a process for the preparation of copolymers containing carboxylate salts of polyvalent metals that may be carried out under mild conditions. The process according to the invention results in products that may with advantage, be used as binders in printing inks.

The invention provides a process for the preparation of a modified copolymer under mild conditions which comprises reacting a copolymer containing carboxyl groups esterified at least partially with a mono- or dihydric alcohol containing at least one primary or secondary hydroxyl group with a salt of a polyvalent metal in the presence of water at a temperature of from 50° to 120°C.

The copolymer containing carboxyl groups esterified at least partially is obtained by reacting a copolymer containing anhydride groups in solution in a solvent that is only partially miscible with water with a mono- or di-hydric alcohol containing at least one primary or secondary hydroxyl group.

The reaction of the copolymer with the alcohol is preferably effected at a temperature of from 50° to 180°C.

The copolymer preferably contains anhydride groups derived from vicinal carboxyl groups or vicinal derivatives of carboxyl groups such as ester or half-ester groups.

By the term only partially miscible with water we mean that, when the chosen solvent is mixed with water, two discrete phases are formed.

If a solid resin is to be prepared, any vicinal half-ester groups still present and not combined with metal ions are preferably converted to the anhydride as far as possible, for example by heating at temperatures from 100° to 210°, preferably 150° to 210° and particularly at 200°C. As a result, the alcohol present in the half-ester is again split off.

The method permits any desired adjustment of the degree of split up of anhydride groups and of the extent of salt formation and therefore the properties of the reaction product may be conveniently adapted to the intended use of the resin. Moreover, the end products have a higher softening point than the starting resin and a colour which is not very different from that of the starting resin.

The process in accordance with the invention is suitable for all copolymers modified with carboxyl group units, especially those containing anhydride groups, which are soluble in the solvents used. It amounts to a considerable technical advance since the preparation of resins modified by salt groups, starting from the anhydride groups of polymers containing vicinal acid groups, has not so far been possible under such mild conditions. In particular, as was found, a partial direct conversion of the anhydride groups to carboxyl groups linked to metal atoms, by a preliminary hydrolysis with water; is not possible under such mild conditions. In the process according to the invention, no decomposition products are formed.

The copolymers used as starting material may be produced by a variety of methods. For instance, resins can be used which are prepared by ionic polymerisation of one or more, olefinically unsaturated, catalytically polymerisable monomers. The introduction of the anhydride groups can be carried out by previously known methods, for example by thermal or radical addition of maleic anhydride or by grafting of maleic anhydride in admixture with monomers that copolymerise with maleic anhydride. It is also possible to modify resins prepared by radical copolymerisation of $\alpha,\beta$-unsaturated dicarboxylic acid anhydrides with suitable comonomers or comonomer mixtures by the process according to the invention. Polymers suitable for the preparation of binders for rotogravure printing, for example telomers from styrene and maleic anhydride, can be prepared discontinuously according to German Pat. specification No. 1 520 744 and continuously according to British Pat. specification No. 963 944. Telomers from petroleum fractions and α,β-unsaturated dicarboxylic acid anhydrides are accessible by methods disclosed in U.S. Pat. application No. 273 789 (corresponding to German Pat. application No. P21 37 105.1) It is also possible to use copolymers in which the carboxyl groups are present as substituted succinic acid half-esters. Such products are described, for example, in the German specification No. 1 644 987. In this case only the reaction with the reactive compound of a polyvalent metal is necessary to give the modified copolymers according to the invention.

It is also possible, to convert into salts other carboxyl or anhydride group containing resins, which as such do not show decomposition phenomena, for example during salt formation at temperature over 200°C, in admixture with the anhydride group containing polymers, by means of the process of the present invention. This applies above all to those cases in which, in admixture with the anhydride group containing polymers of the salt formation, for example acid group containing natural resins such as colophony, tall resin or its derivatives, addition products of maleic acid, maleic anhydride or fumaric acid are added to resin acids, or condensation products from resin acids or phenolic resins.

Hydrocarbon resins which may be conveniently prepared by known methods, e.g. polymerisation of petroleum fractions boiling between −20 and +280°C in the presence of Friedel-Crafts catalysts, are also suitable as starting materials. Petroleum fractions of varying composition suitable for the preparation of the hydrocarbon resins are, for example, obtained during the preparation of unsaturated monomers such as ethylene and propylene through cracking, for example with steam. If necessary, these distillates are further decomposed into subfractions and if desired, to achieve certain product properties, they are again mixed in various proportions or artifically enriched with individual monomers.

Suitable monomers for the preparation of these resins are for example vinyl aromatics such as styrene and/or its derivatives such as α-methyl styrene, the various vinyl toluenes, indene or its derivatives, for example alkyl indene, especially methyl indene, acyclic or cyclic olefines and/or diolefines such as mono-olefines with 2 to 9 carbon atoms, for example propylene, butylene, isobutylene, octene, butadiene, isoprene, and cyclo- or dicyclopentadiene. Preferably, those resins containing at least 50 per cent of cycloaliphatic and/or aromatic monomers are suitable for the purposes of the invention.

The monomer mixtures can generally be polymerised at temperatures below 100°C in the presence of Friedel-Crafts catalysts such as aluminium trichloride or boron trifluoride.

The modification of this hydrocarbon resin may be carried out by methods that are also known, for example thermally, by high energy radiation, such as electron radiation or ultra violet radiation, or by radical addition, of compounds containing carboxyl group units and copolymerisable bonds, preferably of α,β-unsaturated dicarboxylic anhydrides, for example in the presence of peroxides. Thus acid anhydride groups may be introduced by thermal addition to the hydrocarbon resin in the melt flux, possibly in admixture with other comonomers.

The copolymers used as starting material, for example the modified hydrocarbon resins, may contain up to 50 equivalent per cent, preferably up to 25 equivalent per cent, of free carboxyl groups and/or other radicals forming carboxyl groups such as ester-, half-ester-, or amide groups. The percentage value is thus related to the total amount of carboxyl groups present and without regard to whether they are present as such or in the form of derivatives forming carboxyl groups, including the anhydrides Anhydrides suitable for modification of the copolymers, including the hydrocarbon resins, are for example those of maleic acid, citraconic acid, itaconic acid and aconitic acid, Δ-1,2- or Δ-4,5-tetrahydrophthalic acid, possibly the halogen derivatives. The corresponding saponifiable compounds of these acids, either on their own or in admixture, may however also be used.

The mediating action of the alcohols takes place in such a manner that a large number, for example 30 to 90 per cent, of the anhydride groups are first converted into their half-esters. Conveniently, the resin is dissolved in a suitable solvent, for example one of those listed below, and, after the addition of a suitable amount of the alcohol, is heated under reflux to temperatures of from 50° to 180°C until the half-ester is formed so that the alcohol does not evaporate. For this purpose, it is also possible to work under pressure. The amount of alcohol added should be at least equivalent to the mol amount of anhydride groups that are to be converted into the metal salt groups. It may however also be larger. The half-ester is then reacted at 50° to 120°C with a salt forming compound of a polyvalent metal. The reaction conditions therefore are such that no thermal depolymerisation occurs.

As alcohols, aliphatic or cycloaliphatic alcohols with up to 10 carbon atoms are preferred. The half-ester groups should be readily converted to anhydride groups. Preferably, all hydroxyl groups are either primary or secondary. Although alcohols with aromatic radicals are usable, the low molecular aliphatic alcohols such as ethanol, n- or isopropanol, n- or isobutanol, hexanol, ethylene glycol or its monomethyl or monoethyl ether are preferred. Mixtures can also be used.

The solvent used in the process according to the invention must dissolve the starting resin and must be compatible with the alcohol used but must have a low miscibility with water so that it is possible to achieve a two-phase system between the water and solvent. Examples of suitable solvents are benzene, toluene, xylene, tetrahydronaphthalene, cumene, cymol, commercial aromatic mixtures and those primary and secondary alcohols with up to 10 carbon atoms which have only limited miscibility with water. The amount of solvent used depends greatly on the starting resin and on its viscosity in the selected solvent. The aim is to achieve solutions that can be readily stirred. In general, solutions of 20 to 70 per cent are used.

Various reactive compounds can be used as salt forming metal compounds, for example formates or acetates. However, during the reaction with such compounds, a reaction equilibrium occurs which must be displayed by the distillative removal of the free acid formed. It is therefore preferred to use oxides, carbonates and, insofar as available, hydroxides. Compounds of metals of the second group of the periodic table such as magnesium, calcium, barium and zinc are preferred. Compounds of metals from the third group, such as aluminum, can however also be used as well as those of metals of the fourth group such as tin. Preferably, the salt forming metal compound is added in the form of an aqueous suspension or, if the cation is barium for example, as an aqueous solution. The amount of the water used is generally from 5 to 50 per cent by weight of the total mixture but it may exceed these limits either way.

The reaction products can be obtained in the form of the solution obtained during the reaction or in the pure form, for example by careful distillation. If the temperature used for re-formation of the ester groups is near the boiling point of the solvent, the re-formation of the anhydride groups and the distillation of the solvent can be carried out in one operation. This applies especially if the solvent has a fairly low boiling point.

The resins formed are clear products whose colour value in 50 per cent toluene solution does not significantly differ from that of the starting resin. Compared to the starting resins, they have the advantage of a higher softening point and do not therefore show any kind of decomposition phenomena.

To characterise the reaction, the percentage of the carboxyl groups which are converted into the salt is estimated.

$$P = \frac{(\text{mol carboxylate groups})}{(\text{mol carboxyl groups})} \cdot 100$$

By "mol carboxylate groups" is understood the number of mols of the salt-like $COO^{(-)}$ group that is present in unit weight of the resin. By "mol carboxyl groups" is understood the number of mols of carboxyl groups that are present in unit weight before the reaction with the metal, including those groups which are capable of conversion to carboxyl groups.

The value of P may vary from 1 to 100 per cent The adjustment of this value depends upon the application for which the product is to be used. In general, the process is, however, particularly elegant in reactions wherein the value of P is in the range from 1 to 60, preferably 1 to 50. Experience has shown that with excessive salt formation, subsequent distillation of the solvent and of the alcohol leads to difficulties. The threshold value for P beyond which these difficulties may occur depends greatly on the viscosity and the saponificatiion number of the starting resin; lower viscosities and low saponification numbers permit higher values for P.

Resins with a range of molecular weights and acid numbers are suitable for the process as long as they are soluble in the solvents used according to the invention.

The nature of the monomers that do not contain acid or anhydride groups is only of secondary importance.

It is also possible to convert into salts by the process according to the invention other carboxyl or anhydride group containing resins, which as such do not show any decomposition phenomena, for example during salt formation carried out at temperatures in excess of 200°C, in admixture with the anhydride group containing polymers. This applies especially to those cases in which natural resins containing acid groups such as colophony, tall resin or their derivatives are subjected to salt formation in admixture with the anhydride group containing polymers. Suitable derivatives which may be used are the addition products of maleic acid, maleic anhydride or fumaric acid and resin acids and the condensation products of resin acids and phenolic resins.

If reaction by the process in accordance with the invention is carried out at around 100°C, then, where solid resins are being prepared, processing should take place under conditions which, on the one hand avoid thermal decomposition of the synthetic resin but on the other hand permit conversion into the cyclic anhydride of the half-ester which is present in the case of a neutralisation deliberately adjusted to P = 100. In general, it is possible to avoid decomposition if the temperature at which the distillation is carried out does not exceed 210°C. Distillation at temperatures from 150 to 210°C and at a pressure of from 10 to 50 mm, depending upon the boiling point of the alcohol, are especially preferred.

A particularly suitable process for the separation of the solvent is distillation in a rotary evaporator. By this means it is possible to carry out distillation with minimum effect on the resin. It may be of particular advantage to distill of the water first of all, possible azeotropically and possibly with the return of the solvent or entraining agent to the distillation mixture. Alternatively the water may be removed by allowing the product mixture to settle and separating the aqueous layer. In general, because of emulsion formation, the first possibility of water separation must be used.

Various modifications to the process according to the invention are possible so long as it is ensured that no thermal decomposition of the copolymer occurs. For example, the starting resin does not have to be present in solid form. The resins prepared by radical polymerisation are frequently obtained in aromatic solvents or alcohols. In the case of the alcohol resin solutions, direct reaction with an aqueous solution of the reactive compound of the metal is possible.

Half-ester formation from starting resins with particularly inert anhydride groups may be accelerated by the addition of an esterification catalyst soluble in the solvent, for example pyridine, or an alkali metal alcoholate, such as lithium or sodium methalate, ethylate, butylate or phenolate.

The process according to the invention allows the conversion of snythetic, anhydride group containing resins into their salts with polyvalent metals in a convenient manner and above all under mild conditions. Thus these resins of a special quality for a variety of purposes are made available. This also applies to those products which are obtained from anhydride group containing polymers and natural resins containing acid groups such as colophony, tall resins or their above-identified derivatives, by the process according to the invention. In particular, with the resins obtained by the process in accordance with invention, it is possible to utilise the advantages of salt formation to improve the application properties of printing inks. This applies especially in the case of other resins like, for example the hydrocarbon resins obtained with Friedel-Crafts catalysts. For example, for rotogravure inks, only those resins in which a certain limited amount of the anhydride groups has been converted into the salt form are particularly suitable as binders.

It has been discovered by study of the process according to the present invention that excessive salt formation increases the viscosity of the resin solution to excessively high values. Thus the number of bivalent cations which may be built into the resins must be restricted for use as rotogravure inks, since it is known that printing inks in solvents suitable for rotogravure printing should have viscosities, at certain solid contents, within a particular range suitable for the printing technique employed. For toluene rotogravure, for example, at a solid metal content of from 25 to 50 per cent the viscosity of the toluene solution should be from 50 to 1000cP. These viscosity conditions are generally fulfilled by those resins in which the percentage of the carboxyl groups converted into the salt is from 1 to 50 per cent preferably from 2 to 30 per cent. Within these limits, the percentage can and must be adapted to the starting resin involved. For example, the preferred percentage for starting resins that have viscosities from 10 to 50 cP in toluene, is 10 to 50 per cent. If the viscosity of the starting resin is more than 50 cP, then the preferred range for P is from 2 to 30 per cent. and if the viscosity is more than 200 cP, then the preferred range for P is lower still, for example from 1 to 10 per cent.

The starting resins which may be used as modifiers for binders for rotogravure inks should have a molecular weight of from 500 to 5000 because of the limitation of the viscosity. The saponification number of suitable resins is from 50 to 370. The resins modified by partial salt formation in accordance with the invention, apart from those derived from hydrocarbon resins, when used as binders in rotogravure inks, especially in toluene rotogravure inks, show far better behaviour on the paper compared with the starting resins. This applies particularly to those that have been prepared from styrene-maleic anhydride telomers, for example those having a ratio of styrene to maleic anhydride in the range from 2 : 1 to 12 : 1, preferably from 3 : 1 to 8 : 1. Another advantage is the improved gloss which is causally related to the better properties on the paper.

Finally, the affinity of the binder for the pigment is significantly increased in the modified resins according to the invention and this manifests itself, amongst other things, in a better transparency.

The resins prepared in accordance with the invention in particular the derivatives of hydrocarbon resins, are clear products with a colour value that does not significantly differ from that of the starting resins. In comparison with the starting resins, they have the advantage of a higher softening point and, under otherwise identical conditions, they exhibit increased viscosity. They may be used for a variety of purposes as synthetic resin components for synthetic resin containing compounds, for example as binders in paints or printing inks, as additives for adhesives, as thickening agents and textile auxiliaries, for impregnations, etc.

The following Examples and Comparative Tables serve to illustrate the process of the present invention. The resins are characterised in the tables by their softening points (determined by the capillary method) as well as by their colour values and by the viscosity of a 50 per cent solution of the resin in toluene at 20°C.

EXAMPLE 1

150 g of a copolymer, prepared by radical telomerisation of styrene and maleic anhydride in the presence of xylene as telogen, (softening point 103°C, saponification number 122), were dissolved in 320 g xylene and 30 g isobutanol and heated for 2 hours at the boiling point of the mixture (approximately 127°C). 2.55 g BaO in 80 ml of water were added and the mixture was heated for a further 3 hours. Subsequently, the solvent and the alcohol were distilled off until the temperature of the material was 205°C under water jet vacuum. The resin formed had a softening point of 105°C, P = 10 per cent.

EXAMPLE 2

250 g of the starting resin of Example 1 were dissolved in 500 g toluene and 50 g isobutanol and heated to boiling for 2 hours (approximately 127°C). A suspension of 6.1 g Ca(OH)$_2$ in 50 ml of water was then added and the two phase mixture was heated until the reaction was complete. Subsequently, the water was separated by azeotropic distillation and the residual toluene and isobutanol were distilled off. The resin formed had the following properties: softening point 115°C, P = 30 per cent.

EXAMPLE 3

250 g of the starting resin of Example 1 were dissolved in 540 g xylene and 50 g isobutanol and heated to boiling for 2 hours (approximately 127°C). The mixture was treated with a suspension of 1.02 g Ca(OH)$_2$ in 50 ml of water and the subsequent work up was analogous to that described in Example 1. A resin with a softening point of 103°C, P = 5 per cent. was obtained.

EXAMPLE 4

150 g of a styrene-maleic anhydride telomer (8 : 1) with xylene as telogen a softening point of 113°C and a saponification number of 125, were dissolved in 320 g xylene and 30 g propanol and converted into the half-ester by boiling for 2 hours under reflux at approximately 120°C. Subsequently, 1.24 g Ca(OH)$_2$ were added as a suspension in 50 ml of water and the mixture was refluxed for 3 hours at approximately 100°C. Work up of the reaction mixture was analogous to that described in Example 1. The resin obtained had a softening point of 119°C, P = 10 per cent.

EXAMPLE 5

150 g of a styrene-maleic anhydride telomer (6 : 1) with xylene as telogen, a softening point of 100°C, and a saponification number of 175, were dissolved in 500 g xylene and 50 g isobutanol and converted into the half-ester by boiling under reflux at approximately 127°C. A suspension of 2.9 g Ca(OH)$_2$ in 50 ml of water was added. After reaction, the water was first separated by azeotropic distillation and the anhydrous toluene solution further evaporated under vacuum in a rotary evaporator with gravity feed at an oil temperature of 190°C. The resin formed had a softening point of 118°C, P = 10 per cent.

EXAMPLE 6

The telomer used as starting resin was prepared by radical polymerisation of styrene, vinyl toluene, α-methylstyrene, indene and maleic anhydride in the presence of xylene as telogen. The mol ratio of maleic anhydride to the sum of the other components was approximately 8.1. The telomer had a softening point 107°C and a saponification number of 125. This resin was obtained as a 35 per cent solution in xylene. 700 g of the solution were reacted with 50 g isobutanol and heated for 2 hours at 127°C. Subsequently, a suspension of 2.22 g zinc oxide and 50 ml water was added and the mixture was boiled for 3 hours under reflux. The water was first separated by azeotropic distillation and subsequently the toluene distilled off on a rotary evaporator with gravity feed at an oil temperature of 190°C. The resin formed had a softening point of 112°C, P = 10 per cent.

EXAMPLE 7

150 g of the starting resin of Example 4 were dissolved in 350 g amyl alcohol and converted to the half-ester over a period of 2 hours at 135°C. A suspension of 1.25 g Ca(OH)$_2$ in 50 ml water was added and the mixture was boiled under reflux until reaction was complete. Subsequent work up was carried out by the usual method, the temperature of the resin being increased to 210°C under full water jet vacuum. The resin had a softening point of 123°C, P = 10 per cent

EXAMPLE 8

A telomer from styrene, maleic anhydride and acrylic acid with xylene as telogen and a softening point of 83°C and a saponification number of 83 was used as starting resin. The mol ratio of styrene to maleic anhydride and acrylic acid was approximately 8 : 1. 150 g of this resin were dissolved in 300 g xylene and 30 g isobutanol. The further reaction with a suspension of 0.83 g Ca(OH)$_2$ and 50 ml water was carried by the usual method. The modified resin had a softening point of 98°C, P = 10 per cent.

EXAMPLE 9

150 g of the starting resin of Example 1 were dissolved in 300 g xylene and 30 g isobutanol and boiled for 2 hours. Subsequently, a suspension of 1.36 g zinc oxide in 50 ml water was added and the heterogenous mixture was boiled for a further three hours. Subsequent work-up as in the previous Examples yielded a resin with a softening point of 105°C and P = 10 per cent.

COMPARATIVE EXAMPLE A

The preparation by a previously known method carried out at 260°C of a resin modified to the same degree as the resins produced by the process of the present invention is described. 150 g of the starting resin of Example 1 were fused in an atmosphere of nitrogen. After the addition of 3.6 g zinc acetate dihydrate, the mixture was heated to 260°C. This temperature was maintained for 6 hours. The volatile components were collected in a receiver. Thereafter, the remaining volatile substances were removed in vacuo. Cooling was then applied. In the distillate, 94.7 per cent of the expected acetic acid was determined by titration. In addition, the presence of 2.35 per cent by weight (calculated on the basis of the weight of starting resin) of aromatic pyrolysis products was established. The properties of the product resin were as follows: softening point : 85°C, viscosity: 41 cP; colour value: more than 300. This resin therefore had undergone thermal decomposition.

Table 1

| Example | Colour Values Starting Resin | Colour Values Modified Resin | Viscosity Starting Resin cP | Viscosity Modified Resin cP |
|---|---|---|---|---|
| 1 | <1 | 7 | 62 | 115 |
| 2 | <1 | 3 | 62 | 170 |
| 3 | <1 | 2 | 62 | 79 |
| 4 | <1 | 6 | 155 | 520 |
| 5 | <1 | 9 | 126 | 330 |
| 6 | 10 | 15 | 84 | 202 |
| 7 | <1 | 4 | 155 | 580 |
| 8 | 4 | 6 | 120 | 165 |
| 9 | <1 | 3 | 62 | 100 |
| Comparative Example A | <1 | >300 | 62 | 41 |

Further processing of the resins

In order to demonstrate the particular advantages as ink binders of the resins prepared in accordance with the invention, they were processed into toluene rotogravure inks. Toluene solutions of the resins of Examples 1 to 9 and, for comparison, toluene solutions of their starting resins were prepared. These solutions were adjusted to a discharge time of 17 to 20 seconds in the DIN-4-beaker. 14 g pigment red 57 (colour index) were added to 150 g of each solution. The mixture was dispersed for 30 minutes in a suitable implement and then adjusted with further toluene to a discharge time of 17 to 20 seconds.

Printing Tests

The gloss of the rotogravure inks prepared from the resins in accordance with the invention were measured and compared with the gloss of those produced from the starting resins. The extent of bleeding of the ink into the paper was also observed.

All the printing inks were applied with hand coaters in various wet layer thicknesses to paper of 60 g/m$^2$. For the gloss test, the films obtained by single application were tested at a wet film thickness of 24 /μThe results are summarised in table II.

Table II

| Example | Gloss Modifed Resin | Gloss Starting Resin | Bleeding Modified Resin | Bleeding Starting Resin |
|---|---|---|---|---|
| 1 | 22.5 | 6 | No | Yes |
| 2 | 16 | 6.5 | No | Yes |
| 3 | 24 | 7.5 | No | Yes |
| 4 | 12 | 8 | No | Little |
| 5 | 12.5 | 4 | No | Little |
| 6 | 19.5 | 4.5 | Little | Yes |
| 7 | 14 | 8.5 | No | Yes |
| 8 | 11.5 | 3 | Little | Yes |
| 9 | 18 | 6 | No | Yes |

The gloss test on the resin of the comparative Example gave good results. However the ink bled through the paper and the drying time was greater than those of an ink based upon the starting resin.

EXAMPLE 10

A resin with an acid value of 8.9, which was prepared by cationic polymerisation of a petroleum fraction obtained by a cracking process, which contains styrene and various vinyl toluenes and indenes as essential monomers, and to which 2 per cent by weight (calculated on the basis of the polymer) of maleic anhydride had been added, was used as starting material. 300 g of the resin were dissolved in 600 g xylene and 100 g isobutanol and the mixture was boiled under reflux for 2 hours. Subsequently a suspension of 117 g. calcium hydroxide in 50 ml water was added and the mixture was boiled for a further 3 hours under reflux. The solvents were then evaporated and the resin dried briefly at 210°C under a water jet vacuum. The resin obtained had a P value of 50 per cent.

EXAMPLE 11

A resin with an acid value of 35, which had been obtained by thermal addition of 6 per cent maleic anhydride to a hydrocarbon resin prepared by cationic polymerisation of a petroleum fraction containing styrene, the various vinyl toluenes and indene as polymerisable monomers, was used as starting resin. 150 g of this resin were dissolved in 300 g xylene and 50 g isobutanol and the mixture was boiled under reflux for 2 hours. Subsequently, a suspension of 1.13 g magnesium oxide in 50 ml water was added and the mixture was boiled for a further 3 hours. The solvents were distilled off and the resin was dried by heating to 210°C under a water jet vacuum. A resin with a P value of 30 per cent was obtained.

EXAMPLE 12

150 g of the starting resin of Example 11 were dissolved in 300 g xylene and 50 g isobutanol and refluxed for 2 hours. 1.44 g barium oxide and 50 ml water were added and the mixture was refluxed for a further 3 hours. Subsequent work-up was carried out as in Example 10. A resin with a P value of 10 per cent was obtained.

EXAMPLE 13

The reaction was analogous to Example 12 except that 2.29 g zinc oxide were added in the place of barium oxide. The resin obtained had a P value of 30 per cent.

Comparative Example B 300 g of the starting resin of Example 11 were fused in an atmosphere of nitrogen. 4.58 g zonc oxide were added to the melt. This mixture was heated for 30 minutes at 260°C and maintained at this temperature for 3 hours. Subsequently, the mixture was distilled under a water jet vacuum at a temperature of 260°C over a period of 5 minutes and 9 g of distillate was collected. After cooling, a resin with a P value of 30 per cent was obtained. The other properties of the resin (see table III) show clearly that the reaction had been accompanied by decomposition phenomena.

In contrast to the resin products produced by the process according to the invention, which are eminently suitable as binders for printing inks, the product of the comparative Example B is far less suitable for this purpose because of the decomposition products contained therein.

Table III

| Example | Softening Point Starting Resin | Softening Point End Product | Viscosity Starting Resin | Viscosity End Product | Colour Value Starting Resin | Colour Value End Product |
|---|---|---|---|---|---|---|
| 10 | 120°C | 120°C | 26.5 cP | 32 cP | 55 | 80 |
| 11 | 148°C | 155°C | 180 cP | 1540 cP | 60 | 125 |
| 12 | 148°C | 153°C | 180 cP | 250 cP | 60 | 100 |
| 13 | 148°C | 148°C | 180 cP | 1100 cP | 60 | 125 |
| Comparative Example B | 148°C | 140°C | 180 cP | 65 cP | 60 | >300 |

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A resinous composition containing as an essential ingredient a binder comprising a product obtained by
   I. reacting in a first stage a solution of
      1. a copolymer containing a radical selected from the group consisting of (a) anhydride groups of vicinal carboxylic groups, (b) a combination of such anhydride groups with vicinal carboxylic groups, (c) a combination of said anhydride groups with other radicals capable of forming vicinal carboxylic groups and (d) a combination of said anhydride groups with vicinal carboxylic groups and with other radicals capable of forming vicinal carboxylic groups, at a temperature of 50° to 180°C, with
      2. at least one alcohol containing up to 2 hydroxy groups at least one of which being a non-tertiary hydroxy group to yield a reaction product in which at least a part of the anhydride groups is converted to semiester groups, and
   II. reacting
      3. the product thus obtained in the presence of water at a temperature in the range from 50° to 120°C with
      4. a salt-forming compound of a polyvalent metal, the solvent present in the first stage of the reaction being compatible with said alcohol and partially miscible with water only to such an extent that two phases are formed therewith together with at least one pigment and an aromatic hydrocarbon as a solvent.

2. The resinous composition of claim 1 in which the product of the binder is derived from a resin which has been prepared by copolymerisation of a carboxylic acid compound containing a radical selected from the group consisting of radicals (a) anhydride groups of vicinal carboxylic groups, (b) a combination of such anhydride groups with vicinal carboxylic groups, (c) a combination of said anhydride groups with other radicals capable of forming vicinal carboxylic groups and (d) a combination of said anhydride groups with vicinal carboxylic groups with a suitable unsaturated hydrocarbon comonomer and in which fianl product from 1 to 50% of the carboxylic groups are present in the form of a salt.

3. The resinous composition of claim 1 wherein the final product of the binder is derived from a telomer of styrene and maleic anhydride, and wherein the printing ink is a photogravure ink.

4. The resinous composition of claim 1 wherein from 2 to 30% of the carboxylic groups contained in the final product are present in the form of a salt.

5. The composition of claim 1 wherein the copolymer is a petroleum resin.

6. The resinous composition of claim 1 wherein the petroleum resin is a polymerisation product of compound contained in petroleum fractions cut from the products distilling in the range from −20 to +280°C which polymerisation product has been prepared under the influence of a Friedel-Crafts catalyst.

7. The resinous composition of claim 1 wherein the compound with which the polymerisation product has subsequently been reacted, is maleic anhydride.

* * * * *